Jan. 18, 1955
L. O. FUNDINGSLAND
2,699,714
ARTICULATED WEEDER ROD BEARING
Filed May 11, 1953
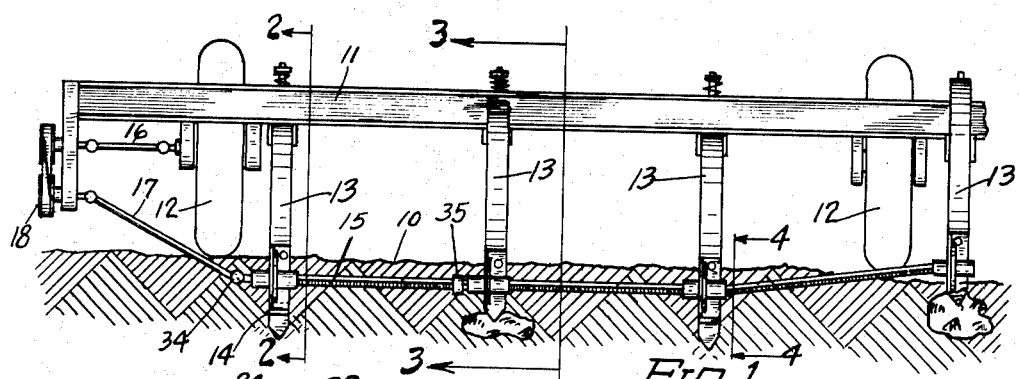
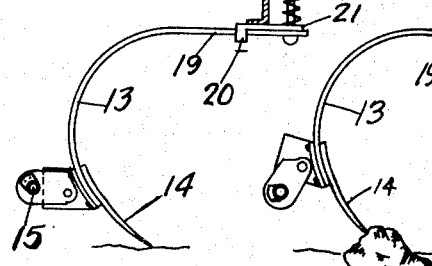
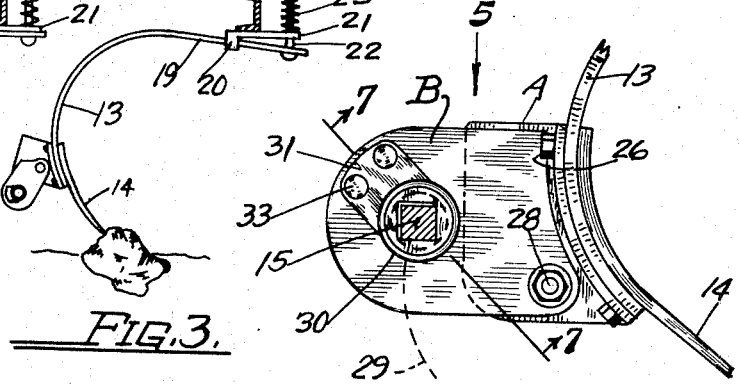
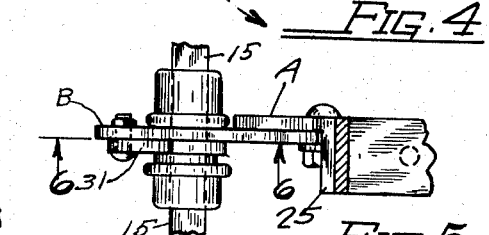
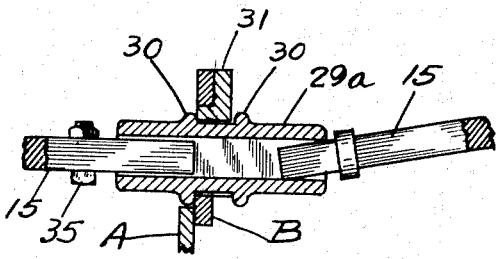
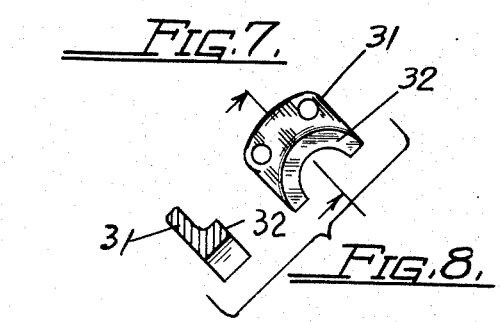
INVENTOR.
Laurence O. Fundingsland
BY
Martin E. Anderson
ATTORNEY

United States Patent Office 2,699,714
Patented Jan. 18, 1955

2,699,714
ARTICULATED WEEDER ROD BEARING

Laurence O. Fundingsland, Burlington, Colo.

Application May 11, 1953, Serial No. 354,032

3 Claims. (Cl. 97—42)

This invention relates to improvements in rod weeders and has reference more particularly to an automatically adjustable bearing for the rod.

As an example of rod weeders of the type to which this invention relates attention is called to U. S. Patent 2,528,270, October 31, 1950, and to U. S. application, Serial No. 278,054, March 22, 1952, now Patent No. 2,646,737. Rod weeders are extensively employed in the semi-arid regions where the land is left fallow every other year to accumulate moisture for the next year's crop. In such cases it is necessary to keep the plowed but unseeded land free from weeds because a crop of weeds uses up as much moisture as a crop of wheat, hence the importance of removing the weeds, preferably by uprooting them, for which purpose rod weeders are admirably adapted.

It has hereto been impractical to employ rod weeders where the soil contains rocks that lie near the top of soil because when the chisels strike a rock the plow shanks flex and bend the weeder rod to such an extend that it must be removed and straightened or replaced by a straight one.

In places where there are no rocks the soil frequently has hard spots which produce a considerable amount of flexing of the plow shanks but not sufficient to bend the weeder rod. In such ground the uneven flexure of the plow shank produces a binding at the bearings in which the rod turns and this increases the frictional resistance to rotation of the rod and increases the wear of the bearings. In such soil the bearing described and claimed in the application above identified is well adapted to prevent the uneven binding of the plow shanks from being transmitted to the rod.

Where the soil contains rocks that are sufficiently near the surface to be hit by the chisels the bending or movement of the plow shanks requires a greater amount of adjustment and U. S. Patent 2,614,475, October 21, 1952, shows one means for adapting a rod weeder for work in stony or rock infested fields.

It is the object of this invention to produce a jointed or articulated rod bearing that permits the chisels to move through a considerable vertical distance while passing over rocks without bending a straight continuous rod.

The above and other objects that may become apparent as the description proceeds are attained by means of a construction and arrangement of parts that will now be described in detail for which purpose reference will be had to the accompanying drawing where the invention has been illustrated and in which Figure 1 is a rear view of a rod weeder showing the essential elements thereof and showing some of the chisels passing over embedded rocks;

Figure 2 is a section taken on line 2—2, Fig. 1;

Figure 3 is a section, similar to Fig. 2, taken on line 3—3, Fig. 1 and shows a chisel passing over a rock;

Figure 4 is a side elevational view of the articulated bearing assembly to which this invention relates, the rod being shown in section;

Figure 5 is a top plan view of the bearing looking downwardly in the direction of arrow 5 in Fig. 4;

Figure 6 is a view partly in section and partly in elevation, taken on line 6—6, Fig. 5;

Figure 7 is a section taken on line 7—7, Fig. 4 and

Figure 8 is a side elevational view and a sectional view of the replaceable bearing block.

Referring now to the drawing reference numeral 10 designates the surface of the ground to be weeded and 11 designates the frame of the chisel plow the ends of which are supported by wheels 12. The chisel plow frame has merely been indicated in outline. Supported by the frame member 11 are a plurality of chisel plow pendents whose shanks have been designated by numeral 13 and whose ground working chisels have been designated by 14. The weeder rod has been designated by numeral 15 and this is turned by power derived from the left hand wheel through jointed flexible shafts 16 and 17 and a motion transmitting device 18 all in a manner well known. The weeder rod is ordinarily a long square bar that is mounted in bearings attached to the lower ends of the plow shanks.

In the embodiment illustrated the plow shanks are shown as terminating at the top in straight portions 19 that pass underneath frame member 11 and are attached to the latter by a pivotal connection 20 which is part of a plate 21. A bolt 22 has its lower end attached to the front end of part 19 and passes through a hole in plate 21. A spring 23 encircles the bolt between the upper surface of plate 21 and nut 24. Spring 23 is under compression and tends to hold the chisel plow shank in the position shown in Figure 2 but permits it to rise in the manner shown in Figure 3 in passing over an embedded rock. It is evident that unless some means is provided to prevent it, the weeder rod will be bent to a point of uselessness when one of the chisels pass over a large stone.

The bearing to which this invention relates and which will now be described, is so designed that it will permit a large vertical movement of the plow shank and chisel without bending the weeder rod beyond its elastic limit.

The bearing assembly consists of two plates A and B. Plate A has a curved flange 25 that is attached to the lower end of the plow shank by bolts 26. Flange 25 has elongated holes through which bolts 26 pass so that adjustments may be made. Plate B has a large circular hole 27 and is pivotally connected with plate A by a bolt 28. It will be evident from Figures 4 and 6 that part B can tilt downwardly about pivot 28 but is limited in its upward movement as is clearly evident from Figure 4. Arcuate line 29 in Figure 4 is intended to show the locus of the center of hole 27 as plate B turns about pivot 28. Due to the fact that pivot 28 has an upward and rearward movement as the chisel moves from the position shown in Figure 2 to that shown in Figure 3 and the center of hole 27 has a forward movement, the center of hole 27 does not move sufficiently to injure the weeder rod. Positioned in hole 27 is a tubular sleeve or journal 29a the axial opening in which is square and of the proper size to receive the weeder rod with a loose fit. The journal sleeve has two spaced ribs 30 as shown in Figure 7. The ribs are of such diameter that they can pass through hole 27. After the tubular sleeve has been positioned in hole 27 a bearing block 31 having a lateral flange 32 whose outer surface has the same curvature as hole 27 and whose concave surface has substantially the same curvature as the outside of the tubular journal, is positioned in hole 27 in the manner shown in Figure 7 and secured to Plate B by means of bolts 33. Flange 32 reduces the size of the opening to such an extent that ribs 30 cannot pass through and the parts therefore remain assembled as shown in Figure 7.

A jointed bearing assembly like that shown in Figures 4 to 8 is attached to each plow shank adjacent its lower end and the openings in sleeves 29a aligned to receive a straight weeder rod which is connected with shaft 17 by means of a universal 34. Collars 35 may be used wherever necessary to limit longitudinal movement of the rod.

For ordinary stony fields a continuous straight weeder rod can be employed. Where the soil is exceptionally stony the weeder rod may be made up of several sections, one for each pair of bearings. For example in Figure 1 the weeder rod would be formed from three separate pieces or sections the ends of which project into the tubular sleeves as shown in Figure 7. With a sectional weeder rod a greater movement of the chisels can take place without injury. By having the holes in sleeves 29a as large as possible without letting the weeder rod turn in them no universal connections are necessary as the parts can assume the position shown in Figure 7. By making hole 27 key hole shaped as shown in applicant's copending application above identified a greater degree of adjustment is possible.

It is now evident that by connecting the weeder rod bearings with the plow shanks by a pivot as above described the plow shanks and chisels may move in response to different soil hardness and in passing over rocks without bending the weeder rod beyond its elastic limit.

The motion transmitting device 18 may be the one shown in applicant's patent above identified or any mechanical equivalent thereof.

Since the tubular sleeves have a loose fit in holes 27 they are free to tilt to some extent therein.

What is claimed as new is

1. In a rod weeder of the type having a wheel mounted frame provided at its rear with a plurality of spaced and aligned chisel plow pendents, a weeder rod bearing attached to the rear of each pendent, a weeder rod journalled in the bearings and means for turning the rod; each bearing comprising a first plate having a curved lateral flange at its front end provided with openings for bolts or the like for attaching it to a pendent near the lower end thereof, a second plate attached to the first plate for arcuate movement about a pivot positioned adjacent the rear of the flange and adjacent the lower edge of said first plate, said second plate having an aperture therein positioned entirely to the rear end of the first plate, a sleeve journalled in the aperture, means for limiting longitudinal movement of the sleeve in the aperture while permitting rotation therein, and means for limiting the upward rotation of the said second plate while permitting free rotation in a downward direction.

2. A bearing in accordance with claim 1 in which a bearing block is removably positioned in the aperture to the rear of the sleeve.

3. A rod weeder in accordance with claim 1 in which adjacent sleeves are connected by a separate section of weeder rod of a size sufficiently smaller than the openings in the sleeves to permit the rod to tilt relatively to the sleeve.

References Cited in the file of this patent

UNITED STATES PATENTS

| | | |
|---|---|---|
| 1,628,022 | Bergloff | May 10, 1927 |
| 1,840,617 | Calkins | Jan. 12, 1932 |
| 2,614,475 | Mowbray | Oct. 21, 1952 |